Feb. 1, 1966   J. D. GIULIE ET AL   3,231,936
COIL WINDING MACHINE
Filed Sept. 24, 1962   4 Sheets-Sheet 1
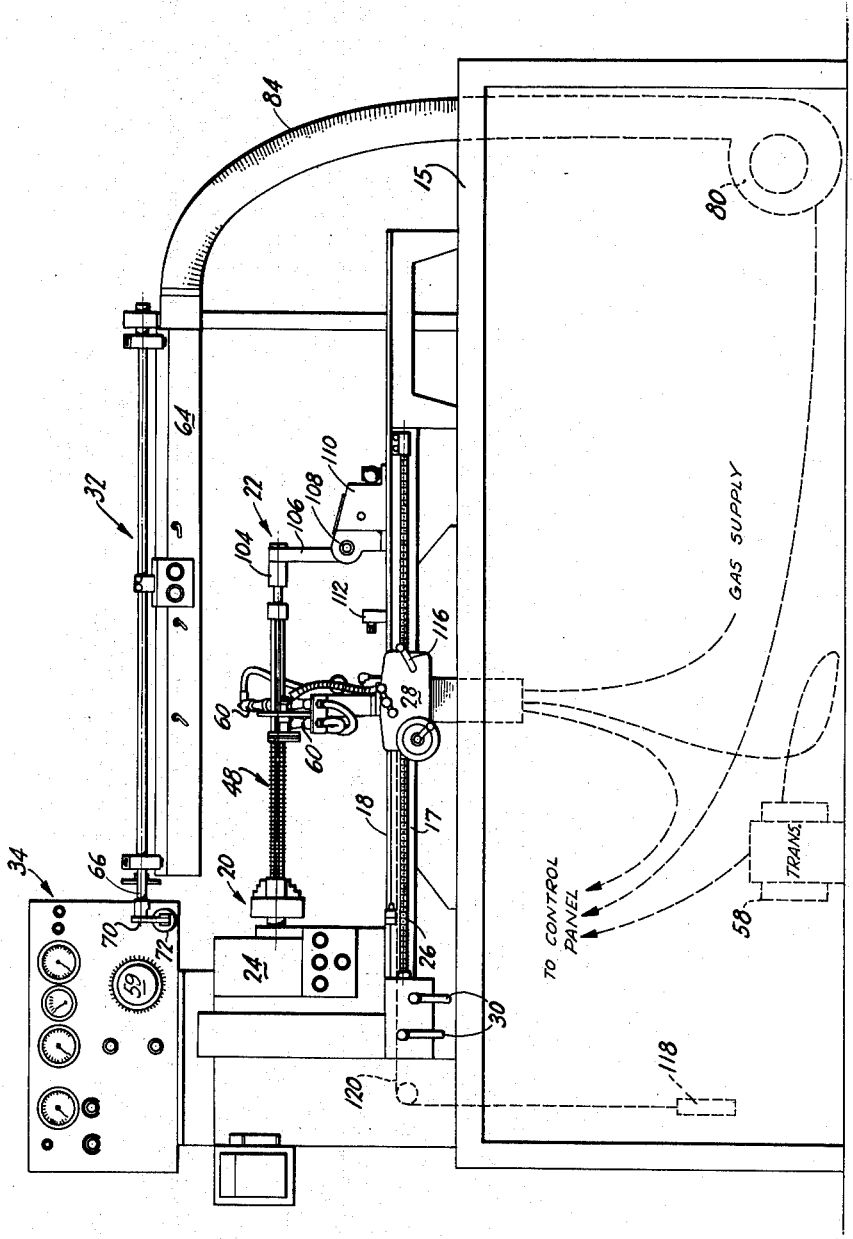
INVENTORS
JOE D. GIULIE
LOUIS P. LAZZARINI
CHARLES F. PEASLEY
BY: Eckhoff and Slick
ATTORNEYS

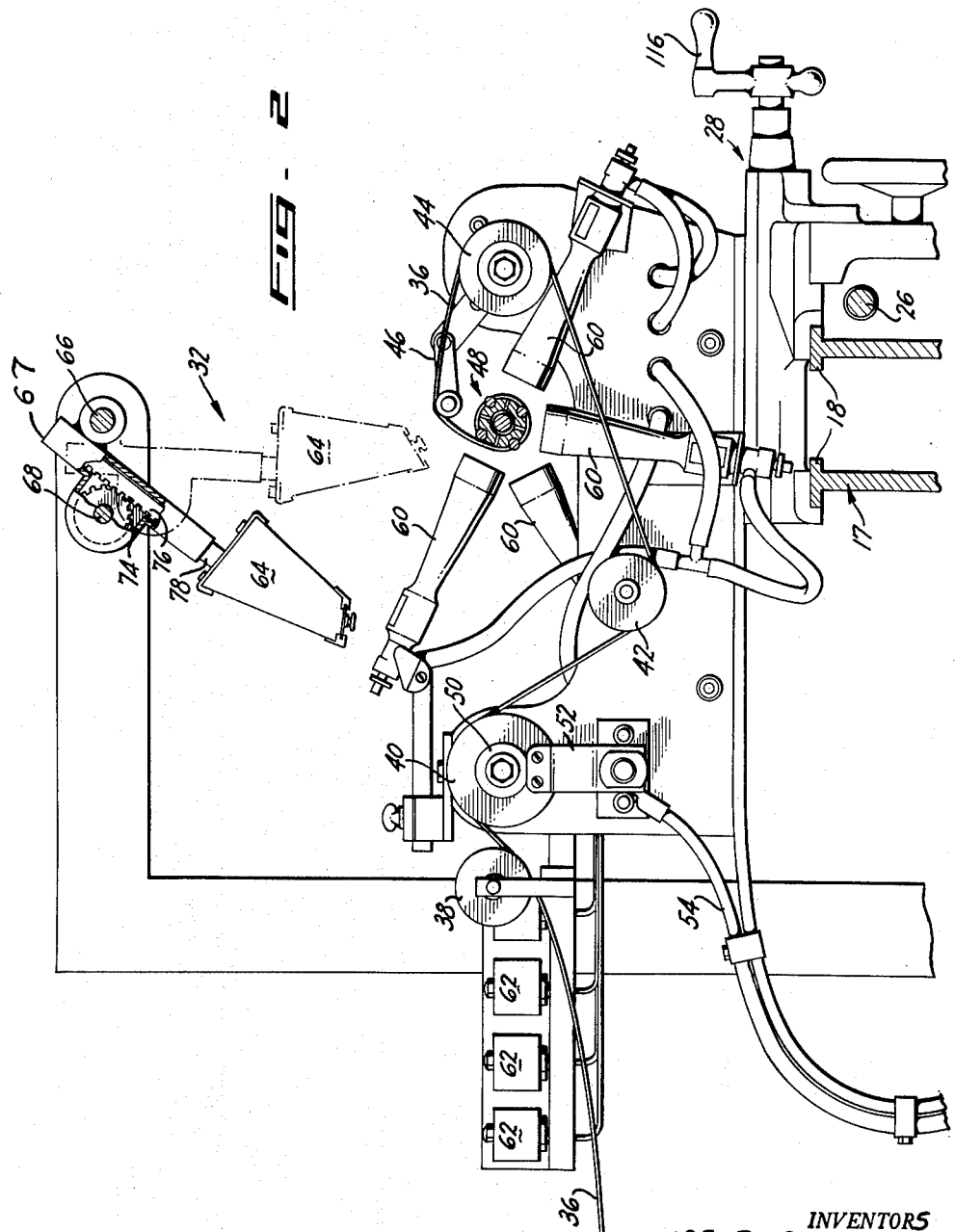

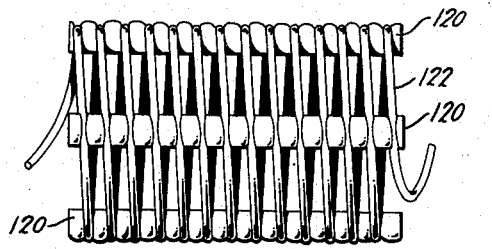
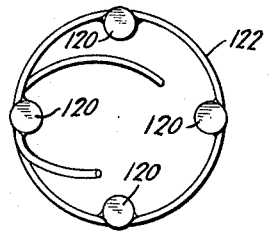
FIG. 4    FIG. 5
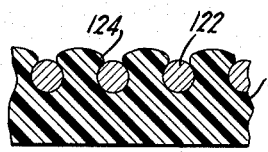
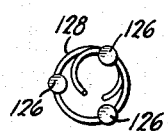
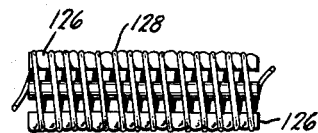
FIG. 6    FIG. 8    FIG. 7
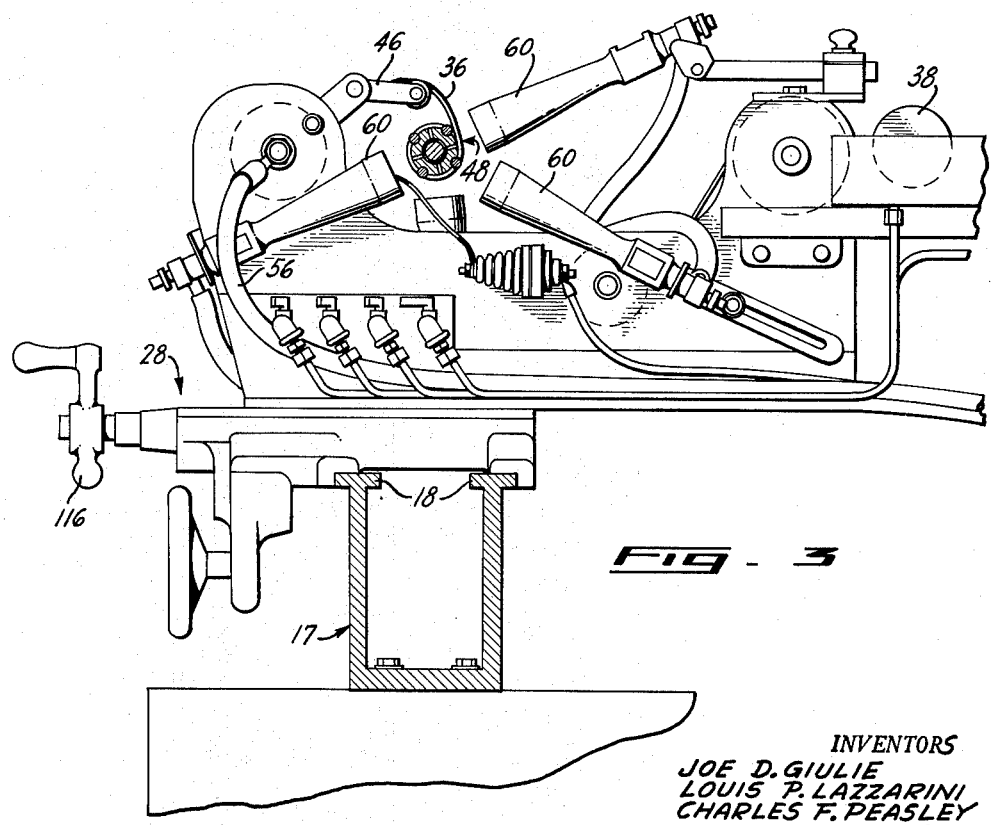
FIG. 3
INVENTORS
JOE D. GIULIE
LOUIS P. LAZZARINI
CHARLES F. PEASLEY

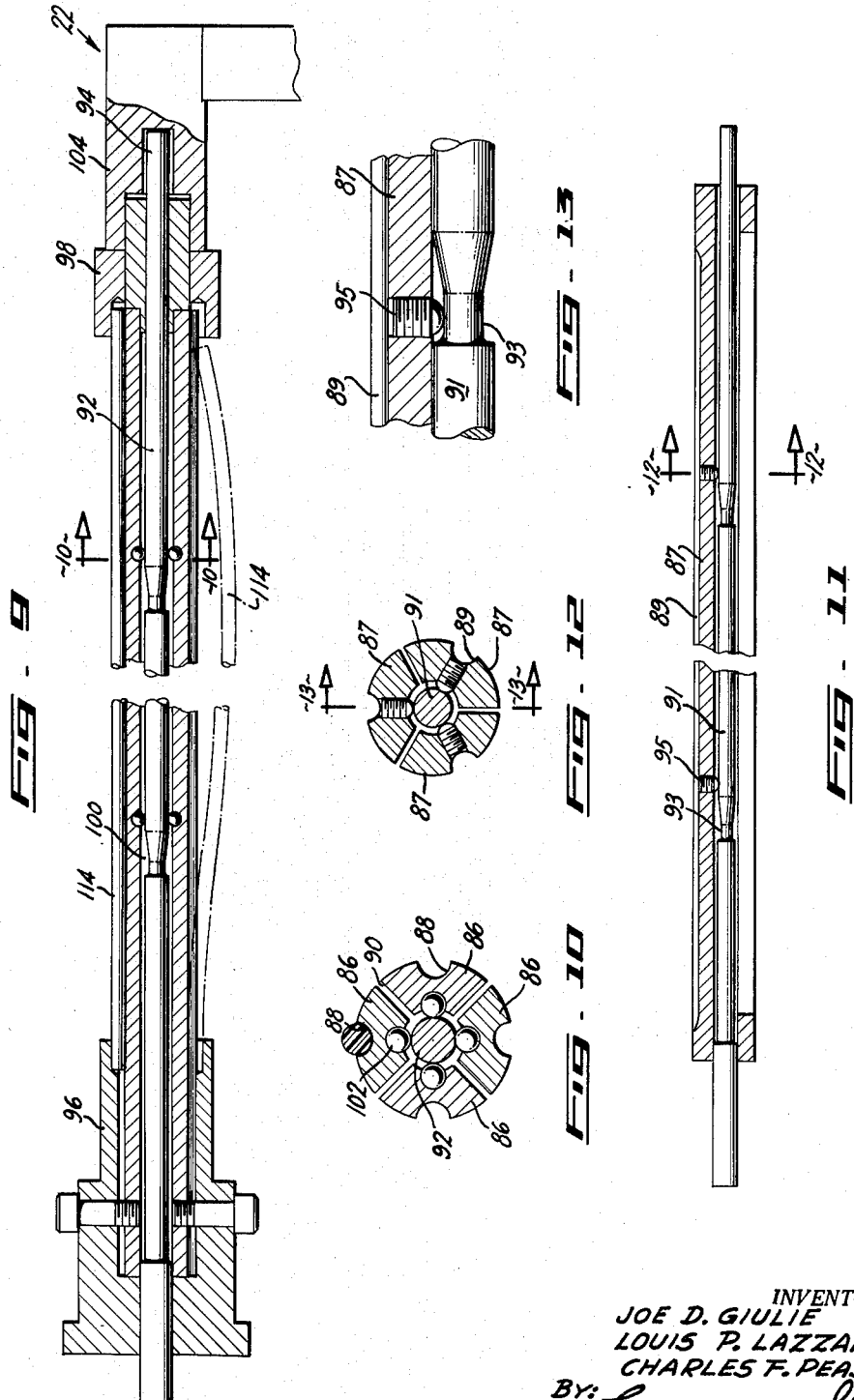

United States Patent Office 3,231,936
Patented Feb. 1, 1966

3,231,936
COIL WINDING MACHINE
Joe D. Giulie, Louis P. Lazzarini, and Charles F. Peasley, Sunnyvale, Calif., assignors to Illumitronic Systems Corporation, a corporation of California
Filed Sept. 24, 1962, Ser. No. 225,749
3 Claims. (Cl. 18—19)

This invention relates to a coil winding machine and mandrel therefor and more particularly relates to a machine for winding coils of the air insulated variety.

Air insulated coils are electrical induction coils which are ordinarily used in radio frequency application and which comprise a number of turns of spaced wire, generally copper, wound on a series of thermoplastic rods so that there is almost no solid material on the interior of the coil which material would detract from the efficiency of the coil. A well known example of such a coil is that sold under the trademark "Air Dux."

It is heretofore been a laborious process to wind such coils and it is therefore an object of the present invention to provide a machine for winding coils which is simple in operation, which is adapted to wind coils of high quality with a minimum amount of labor.

A further object of this invention is to provide a split mandrel for a coil winding machine which enables the coils to be wound on a solid mandrel, which mandrel can then be collapsed by a single simple movement so that it can be removed from the finished coil and the operation repeated.

Other objects will be apparent from the specification which follows.

In the drawings forming a part of this application:

FIGURE 1 is a front view of a coil winding machine embodying the present invention.

FIGURE 2 is an enlarged partial side view of the machine shown in FIGURE 1, looking at the machine from the left hand side as shown in FIGURE 1.

FIGURE 3 is a view similar to FIGURE 2 but showing the right hand side of the machine.

FIGURE 4 is a side view of a typical coil wound on the machine embodying the present invention.

FIGURE 5 is a side view of the coil shown in FIGURE 1.

FIGURE 6 is a partial sectional view on an enlarged scale of the coil shown in FIGURE 4.

FIGURE 7 is a side view of another coil wound on the machine of the present invention.

FIGURE 8 is an end view of the coil shown in FIGURE 7.

FIGURE 9 is an enlarged sectional view of a mandrel used with the machine of the present invention.

FIGURE 10 is an enlarged sectional view on the line 10—10 of FIGURE 9.

FIGURE 11 is a sectional view of another form of mandrel embodying the present invention.

FIGURE 12 is a sectional view of the line 12—12 of FIGURE 11.

FIGURE 13 is an enlarged partial sectional view on the line 13—13 of FIGURE 12.

Referring now to the drawings by reference characters, the coil winder of the present invention is mounted on a framework 15 so that it will be at a convenient height for an operator. The coil winder has many parts taken from a standard screw-cutting metal lathe and comprises a bed 17 with ways 18 having a headstock generally designated 20 and a tailstock generally designated 22. The headstock 20 is adapted to be driven by the mechanism 24 as in common in the lathe art, which mechanism also drives a lead screw 26. Lead screw 26 is used to traverse the guide mechanism 28 which, in an unmodified lathe, would be the tool rest, but which has been adapted as a wire guide and holder for heating elements as is later explained. Suitable controls 30 are provided for regulating the speed of the lead screw with respect to the speed of the headstock 20, it being understood, of course, that if a relatively coarse wire is being wound a fairly rapid traverse will be used, while if a finer wire is used a slower rate traverse will be used. Mounted over the bed of the lathe is the cooling assembly 32, while a control box 34 is mounted at one end of the lathe to contain controls for the various parts as described.

The guide mechanism 28 carries pulleys which serve as wire guides as well as Bunsen burners for heating the mandrel and wire and also carries means for electrically heating the wire. The wire 36 comes from a supply reel, not shown, under a first fiber pulley 38, over a metal pulley 40, under a second fiber pulley 42 and thence around a second metal pulley 44. The wire 36 then passes over a tensioning roller assembly 46 and thence on to the coil 48 being wound. The pulley 40 is of metal but has an insulating hub 50 and is supplied with a brush 52 for conducting current from the wire 54. The pulley 44 is also of metal and, although it is nominally at ground potential, a brush not illustrated connects wire 56 with the pulley 44 so that the bearings will not be required to conduct the heating current. Because of the low resistance of the wire being wound, the current must be on the order of 300 or 400 amperes and it will be understood that current of this magnitude would otherwise cause failure of the pulley bearings. Current is supplied through the wires 54 and 56 from a transformer 58 mounted on the base of the machine and a variable voltage transformer 59 can be used to regulate the current. Mounted around the periphery of the mandrel are a plurality of Bunsen burners 60. Although four burners have been illustrated, it is obvious that more or less might be used depending upon the operation at hand. Gas is supplied to the burners by the tubing connections shown and air may be supplied as well, particularly for those burners called upon to operate in an inverted position. The gas and air supply to the burners is regulated by the burner controls 62, there being one individual control for each burner so that more or fewer burners can be used at varying degrees of capacity depending upon the particular coil being wound. Further, a master control 34 turns the burners on and off simultaneously. Thus, the height of the individual burners is controlled by the controls 62 while the control 34 determines whether the burners shall be on or off.

Mounted over the framework is the air cooling means which has been generally designated 32. This structure comprises an air manifold and outlet 64 which runs the length of the machine and which has a number of openings near the bottom thereof. The manifold 64 is held by arms 78 which slide in a carrier 67 which is attached to a rod 66. Rod 66 is mounted for rotation and has an arm 70 attached thereto which is connected to solenoid 72. The carrier 67 also carries a shaft 68 which is provided with a gear 74 which meshes with a rack 76 on arm 78. As the core of solenoid 72 is drawn in, the rod 66 is rotated (counter-clockwise in FIGURE 2) so that the air manifold 64 is brought in proximity with the coil being wound 48. The proximity of the manifold to the work can be adjusted by rotating shaft 68. The conduit 64 is provided with air from a blower 80 through a flexible tube 84. The blower 80 as well as the solenoid 72 are actuated by the control box 34.

Referring now to FIGURES 9 through 11, and particularly FIGURES 9 and 10, there is shown a mandrel having four segments 86. Each of the segments has a notch 88 running the length thereof which is adapted to receive a thermoplastic rod. The depth of the notches 88 is such that about half of the diameter of the rod will fit into the notch, leaving the other half exposed. The segments 86 do not fit together tightly but in their outward position have spaces 90 therebetween. The center of the mandrel is hollow and is provided with a rod 92 running the length thereof and having a protruding end 94. At one end the segments 88 fit into the cap assembly 96 which is adapted to be held by the headstock of the lathe while at the other end the rods are held by the cap assembly 98 which is adapted to be held by a tailstock assembly 22. The rod 92 has one or more depressions 100 therein while the segments 86 have small depressions adjacent to the depressions 100 to hold a ball bearing 102. It will be seen by reference to FIGURE 9 that when the rod 92 is moved to the left, the ball bearings 102 will push outwardly against the segments 86 while if the rod 92 is moved to the right, the balls can fall into the depressions 100, allowing the mandrel to collapse. It will also be apparent that as the tailstock 22 comes into engagement with the mandrel, the rod 94 will be displaced to the left and will be held in this position as long as the tailstock is in place.

In FIGURES 11 through 13 a slightly different form of mandrel is shown but the principle of operation is exactly the same. Here a plurality of segments 87 are provided with notches 89 and are held apart by a center rod 91. The center rod 91 is notched as at 93 but instead of the ball bearings previously described, a series of round-ended cap screws 95 stems from the segments for the rods. As can be seen from the drawing, the function is exactly the same but this structure is easier to assemble in small sizes than the mandrel employing the balls.

The tailstock 22 comprises an upper cap assembly 104 and an upright 106 which is provided with a hinged connection 108 to the base member 110. This allows mandrels to be inserted and removed quite easily since it is only necessary to bend the arm 106 backward to insert or remove a mandrel.

Mounted on the ways 18 is a limit switch 112 which is connected to the control box 34. When the carrier 28 strikes the limit switch 112 the motor and traversing mechanism driving the headstock and lead screw 26 are cut off, the burners are cut off, the electricity passing through the wire being wound is cut off, the blower 80 is started and the manifold 64 is brought close to the wound coil as is shown in dot-dash lines in FIGURE 2.

In order to wind a coil, the operator places the necessary number of thermoplastic rods 114 on the mandrel, bending them as is shown in dot-dash lines in FIGURE 9 to insert them. The individual burner controls 62 and the variable voltage transformer 59 are regulated depending upon coil and wire size. If insulated wire is being wound, electric heating is not possible so the electricity is cut off and the gas increased. A wire is then threaded onto the start of the coil and the starting button pushed which starts the electricity, gas and drive mechanisms. The first few turns are ordinarily wound over the cap 96 since at this point the wire and plastic have not been brought up to winding temperature. The operation then proceeds automatically until the limit switch 112 is contacted, whereupon the operation shuts off as has been previously described. The operator then snips off the wire and releases the guide mechanism 28 by means of the lever 116, whereupon the guide mechanism is retracted to the left hand side of the machine either by hand or by the operation of a weight 118 pulling the cable 120. The tailstock is then moved away from the mandrel and this releases the mandrel as well as the rod in the center of the mandrel, so that the mandrel can be collapsed and removed from the coil.

FIGURES 4 through 8 show two typical coils which can be wound with the machine of the present invention. In FIGURES 4 through 6, four thermoplastic rods 120 are employed with the wire 122 wound therearound. It will be noted from the enlarged section of FIGURE 6, the wire 122 sinks deeply into the plastic 120 and the plastic actually overlaps the wire somewhat as at 124, forming an extremely strong coil. In FIGURES 7 and 8 a somewhat similar coil is shown except here the coil is of smaller size and only three plastic members 126 are employed to support the wire 128.

We claim:

1. A coil winding machine for making air insulated coils wherein a spaced coil of a metal conductor is wound on a plurality of thermoplastic supporting members comprising in combination:
    (a) a mandrel with means thereon to hold a plurality of spaced thermoplastic rods around the periphery thereof;
    (b) means for rotating said mandrel;
    (c) a wire guide for guiding wire onto the mandrel;
    (d) means for traversing said guide in synchronism with the turning of the mandrel;
    (e) means for heating said mandrel and the wire being wound thereon;
    (f) cooling means for directing a blast of cold air over the mandrel; and
    (g) automatic stop means for stopping said mandrel after said guide means has traversed a desired distance, said stop means having means associated therewith to shut off the heating means and to start said cooling means.

2. A coil winding machine having the mandrel of claim 3 wherein said machine has a movable tailstock being movable to a mandrel holding position and to a mandrel releasing position, said tailstock having means holding said rod in its first position when the tailstock is in the mandrel holding position.

3. The coil winding machine of claim 1 wherein the mandrel is, a split mandrel having at least three segments forming a generally cylindrical, hollow element, a groove on the outer surface of each segment, said groove being adapted to hold a rod in axial alignment, a plurality of solid elements extending inwardly from the inner surface of each of said segments, a center traverse rod having a plurality of lengthwise recesses corresponding in location to said plurality of solid elements, whereby when said traverse rod is in a first position said rod pushes outwardly on the solid elements, expanding the mandrel, and when said traverse rod is in a laterally displaced second position, said solid elements ride into the recesses, collapsing the mandrel.

References Cited by the Examiner
UNITED STATES PATENTS

| | | | |
|---|---|---|---|
| 184,462 | 11/1876 | Cooper | 18—34 XR |
| 1,365,015 | 1/1921 | Zwicker | 153—57 XR |
| 1,607,384 | 11/1926 | Ball | 18—45 |
| 1,676,325 | 7/1928 | Doll | 18—45 |
| 1,739,246 | 12/1929 | Majice | 156—275 |
| 2,227,602 | 1/1941 | Platt. | |
| 2,315,634 | 4/1943 | McCall | 25—128 |
| 2,450,324 | 9/1948 | Wilson et al. | 18—19 |
| 2,740,987 | 4/1956 | Moncrieff | 18—19 |
| 2,796,631 | 6/1957 | Stegmann. | |
| 3,016,571 | 1/1962 | Adams | 18—19 |
| 3,059,669 | 10/1962 | Fitzpatrick | 153—67 XR |

WILLIAM J. STEPHENSON, *Primary Examiner.*